United States Patent
Roy et al.

(10) Patent No.: US 9,092,314 B2
(45) Date of Patent: Jul. 28, 2015

(54) ON-THE-FLY TECHNICAL SUPPORT

(71) Applicant: Xilinx, Inc., San Jose, CA (US)

(72) Inventors: Debraj Roy, Rourkela (IN); Achutha Rama Chowdary Alapati, Buttayagudem Mandal (IN); Shrinivasraj Muddey, Hyderabad (IN)

(73) Assignee: XILINX, INC., San Jose, CA (US)

(*) Notice: Subject to any disclaimer, the term of this patent is extended or adjusted under 35 U.S.C. 154(b) by 229 days.

(21) Appl. No.: 13/719,574

(22) Filed: Dec. 19, 2012

(65) Prior Publication Data

US 2014/0173350 A1  Jun. 19, 2014

(51) Int. Cl.
*G06F 11/00* (2006.01)
*G06F 17/30* (2006.01)
*G06F 11/07* (2006.01)

(52) U.S. Cl.
CPC .......... *G06F 11/006* (2013.01); *G06F 11/0706* (2013.01); *G06F 11/079* (2013.01); *G06F 11/0766* (2013.01); *G06F 11/0775* (2013.01); *G06F 11/0787* (2013.01); *G06F 17/30595* (2013.01)

(58) Field of Classification Search
CPC ... G06F 11/00; G06F 11/006; G06F 11/0706; G06F 11/0709; G06F 11/0766; G06F 11/0775; G06F 11/0778; G06F 11/0784; G06F 11/0787; G06F 11/079; G06F 11/0793; G06F 17/30; G06F 17/30011; G06F 17/30067; G06F 17/30283; G06F 17/30716; G06F 17/30719; G06F 17/3089; G06F 17/30893

USPC .......................................................... 714/26
See application file for complete search history.

(56) References Cited

U.S. PATENT DOCUMENTS

| | | | |
|---|---|---|---|
| 5,463,562 A * | 10/1995 | Theobald ...................... | 716/105 |
| 6,374,261 B1 * | 4/2002 | Alvarez et al. ................. | 706/45 |
| 2004/0103412 A1 * | 5/2004 | Rao et al. ...................... | 717/171 |
| 2005/0120112 A1 * | 6/2005 | Wing et al. .................... | 709/224 |
| 2006/0242286 A1 | 10/2006 | Hawkins et al. | |
| 2007/0006014 A1 * | 1/2007 | Huang .............................. | 714/2 |
| 2008/0263404 A1 * | 10/2008 | Vidiyala .......................... | 714/38 |
| 2009/0292383 A1 * | 11/2009 | Bohl et al. ..................... | 700/103 |
| 2010/0318846 A1 | 12/2010 | Sailer et al. | |
| 2011/0296243 A1 | 12/2011 | Calman et al. | |
| 2011/0302098 A1 * | 12/2011 | Yoshida et al. ............... | 705/319 |
| 2012/0066547 A1 | 3/2012 | Gilbert et al. | |
| 2013/0047148 A1 * | 2/2013 | Lui et al. ....................... | 717/173 |

* cited by examiner

*Primary Examiner* — Bryce Bonzo
*Assistant Examiner* — Anthony J Amoroso
(74) *Attorney, Agent, or Firm* — W. Eric Webostad; LeRoy D. Maunu

(57) ABSTRACT

A method performed by an information handling system for on-the-fly technical support is described. In an exemplary method, an error message is read to obtain an error code therefrom. A project directory is searched to obtain a report; where the report indicates a failed module of a plurality of executable modules, and where the report is associated with the error message. A source of an error is identified from the error message. A failed stage of the failed module is identified from the report. A case inquiry for the error message is prepared for searching a document for resolution of the error, where the case inquiry identifies the failed stage. A network is accessed, and the case inquiry is sent over the network.

17 Claims, 9 Drawing Sheets

ON-THE-FLY TECHNICAL SUPPORT

TECHNICAL FIELD

The invention relates to on-the-fly technical support. More particularly, the invention relates to an application for automatically retrieving information for error resolution.

BACKGROUND

Heretofore, if a user encountered any error while running an application, they might check for a solution by performing a web-based keyword search, and accessing information in any of a variety of possible networked databases. This may involve multiple iterations of manual user input to obtain relevant information, which may be a time consuming process for resolving an error. Furthermore, information returned responsive to such searching may not be consistent, reliable, and/or trustworthy. Additionally, there may be a high dependency on the keywords selected by the user for performing such search in order to obtain relevant information.

Accordingly, it would be desirable and useful to provide on demand support that overcomes one or more of the above-mentioned issues.

SUMMARY

One or more embodiments generally relate to on-the-fly technical support.

A method performed by an information handling system for on-the-fly technical support is described. In an exemplary method, an error message is read to obtain an error code therefrom. A project directory is searched to obtain a report; where the report indicates a failed module of a plurality of executable modules, and where the report is associated with the error message. A source of an error is identified from the error message. A failed stage of the failed module is identified from the report. A case inquiry for the error message is prepared for searching a document for resolution of the error, where the case inquiry identifies the failed stage. A network is accessed, and the case inquiry is sent over the network.

An exemplary system is also described. The system includes a first server for hosting a document online, where the document includes a plurality of sections and a plurality of subsections for the plurality of sections. The plurality of subsections is associated with one or more error records. The one or more error records are associated with one or more error codes in association with one or more errors that can occur under the plurality of subsections. At least a second server communicatively coupled with the first server is also included in the system, for hosting a plurality of databases. The error records have at least one link to at least one of the plurality of databases for fetching relevant information therefrom for resolving the one or more errors.

A computer program product for on-the-fly technical support is also described. The computer program product includes a tangible computer-readable storage medium, and a computer-readable program stored on the tangible computer-readable storage medium. The computer-readable program is processed by an information handling system for causing the information handling system to perform operations, as follows. An error message generated by an application program is read to obtain an error code from the error message. A project directory is searched to obtain a report generated by the application program. The application program includes a plurality of executable modules, and the report indicates a failed module of the plurality of executable modules associated with the error message. A source of an error is identified from the error message. A failed stage of the failed module is identified from the report. A case inquiry for the error message is prepared for searching an online document for resolution of the error, where the case inquiry includes the failed stage. A network is accessed, and the case inquiry is sent over the network.

BRIEF DESCRIPTION OF THE DRAWINGS

Accompanying drawings show exemplary embodiments. However, the accompanying drawings should not be taken to limit the embodiments shown, but are for explanation and understanding only.

DETAILED DESCRIPTION

Figure 1:
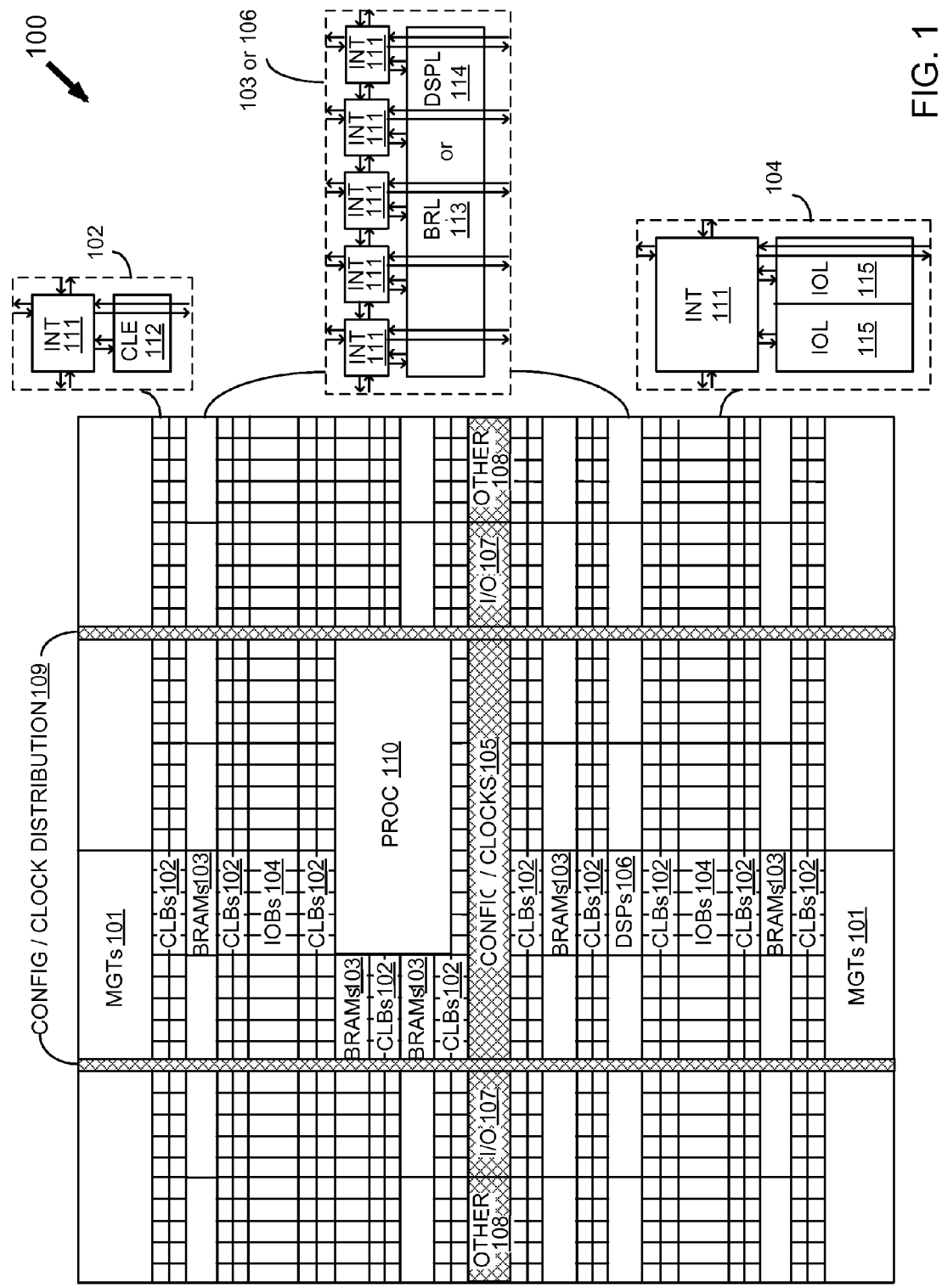
FIG. 1 is a simplified block diagram depicting an exemplary columnar Field Programmable Gate Array ("FPGA") architecture.

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the one or more embodiments. For ease of illustration, the same number labels are used in different diagrams to refer to the same items; however, in alternative embodiments the items may be different.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system and methods also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The structure for a variety of these systems will appear from the description below. In addition, the examples included herein are not described with reference to any particular programming language. It will be appreciated that a variety of programming languages may be used to implement the teachings as described herein.

Before describing the examples illustratively depicted in the several figures, a general introduction is provided to further understanding. As described below, an application may include or have access to a debugger to provide on demand ("on-the-fly") technical support, which may be used to avoid time consuming manual searching. Such debugger may be used or invoked responsive to an error message, and thereafter check to determine if an answer record exists for such error, and if not, to create a request for technical support ("webcase") and/or a post for a community of users to address such error for the user. Along those lines, relevant information for debugging an error may be automatically fetched from one or more available databases, whether local to a user's computer or online accessible by a user's computer.

With the above general understanding borne in mind, various exemplary debuggers for on-the-fly support are generally described below. Because one or more of these examples are exemplified using a particular type of IC, a detailed description of such an IC is provided below. However, it should be understood that other types of applications may benefit from one or more of the examples described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured FPGA, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured FPGA, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
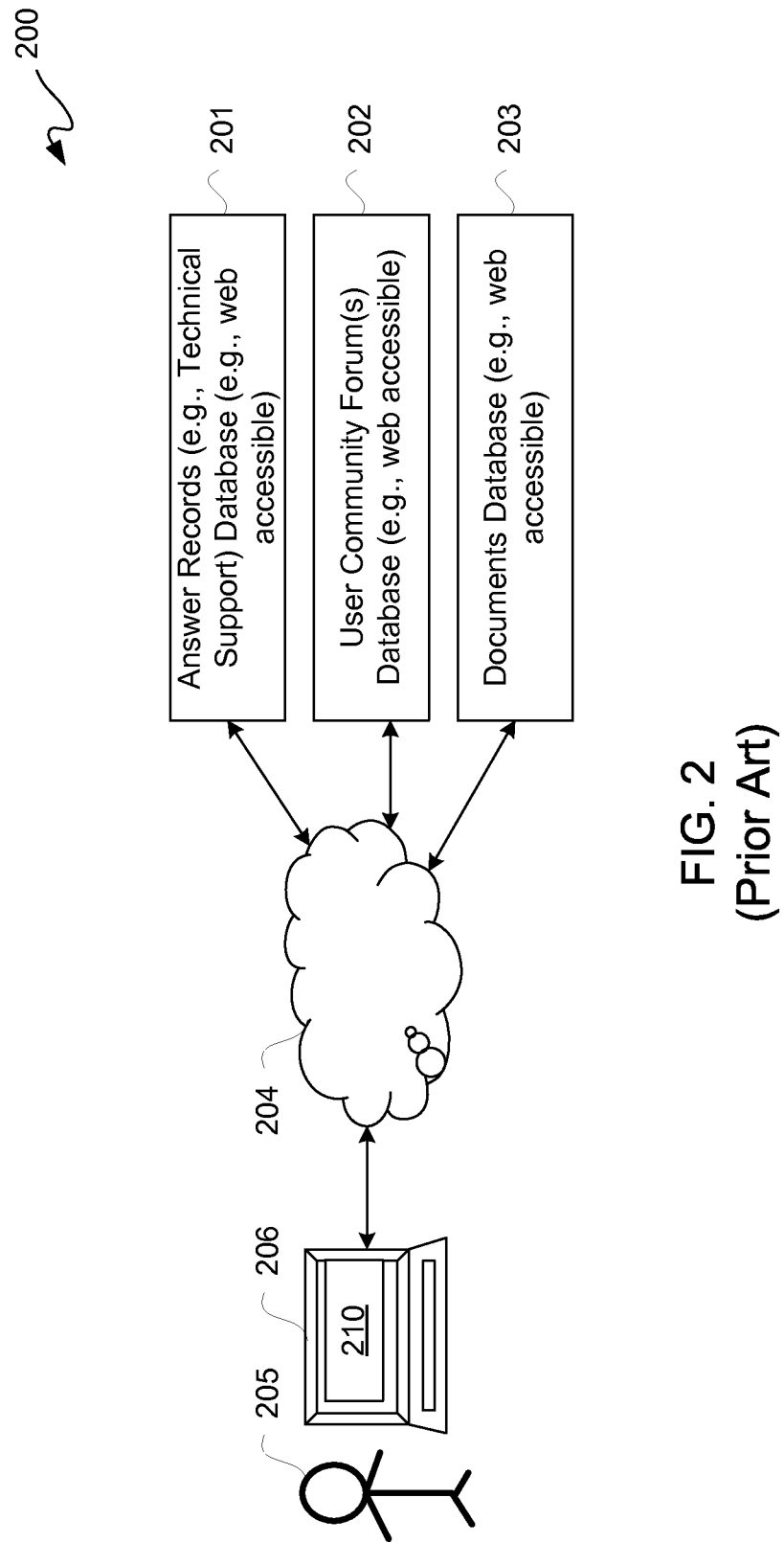
FIG. 2 is a block/perspective diagram depicting an exemplary conventional debug flow.

FIG. 2 is a block/perspective diagram depicting an exemplary conventional debug flow 200. A user 205 using a computer 206 may encounter an error when executing a software application ("tool") 210. In the past, a user 205 would manually inquire over the Internet cloud 204 individually to one or more databases 201 through 203 to look for a solution information for fixing the error. In this example, database 201 may be a web accessible database of answer records, such as from technical support answering user questions. Open user questions being worked on by technical support personnel may be referred to as "trouble tickets," "webcases," or other names. Database 202 may be one or more web accessible user community forums having posts and threads thereof answering user questions. Lastly, database 203 may be web accessible documents, which may be provided by a manufacture of a product. If searches of one or more databases 201 through 203 did not provide a helpful solution, a user 205 generally would manually create a webcase for technical support and forum post for a user community.

Debug flow 200 may be for any of a variety of tools which may generate one or more errors. For purposes of clarity by way of example and not limitation, an electronic design automation ("EDA") tool is described, even though in other instances other types of tools may be used. An EDA tool may be used for transforming a user's circuit design into configuration information for configuring an FPGA, namely to instantiate a user's circuit design in an FPGA, including without limitation instantiation using programmable resources of such FPGA.

Once an EDA tool 210 generates an error, a user 205 may be given an option to search answer records or solution statements online in answer records database 201. To invoke such online searching, a user 205 may click on an error message or right click on an error message and select a search in answer records option. Once such online searching is invoked, a keyword search may be performed by user 205. Results from such search may be displayed in a webpage within EDA tool 210 or in a separate window. If this search of answer records does not help user 205 in resolving an error, then user 205 may perform one or more other searches in one or more user community forums databases 202 and/or documents databases 203. A user may further perform a World Wide Web search using Google, Bing, Yahoo, or some other search engine. If the searches failed to help user 205 resolve their error, user 205 may manually create a webcase for a technical support team and/or post a query on a user community forum.

Unfortunately, manual inquiry of different search spaces by a user 205 is time-consuming. Such manual searching may result in inconsistent search results due to dependency on keywords used by user to search. Furthermore, too much information which may be irrelevant to fixing the error in question may be returned. Additionally, manual creation of a webcase and/or a forum post with all relevant information may vary among users leading to inconsistent and/or prolonged resolutions.

Figure 3:
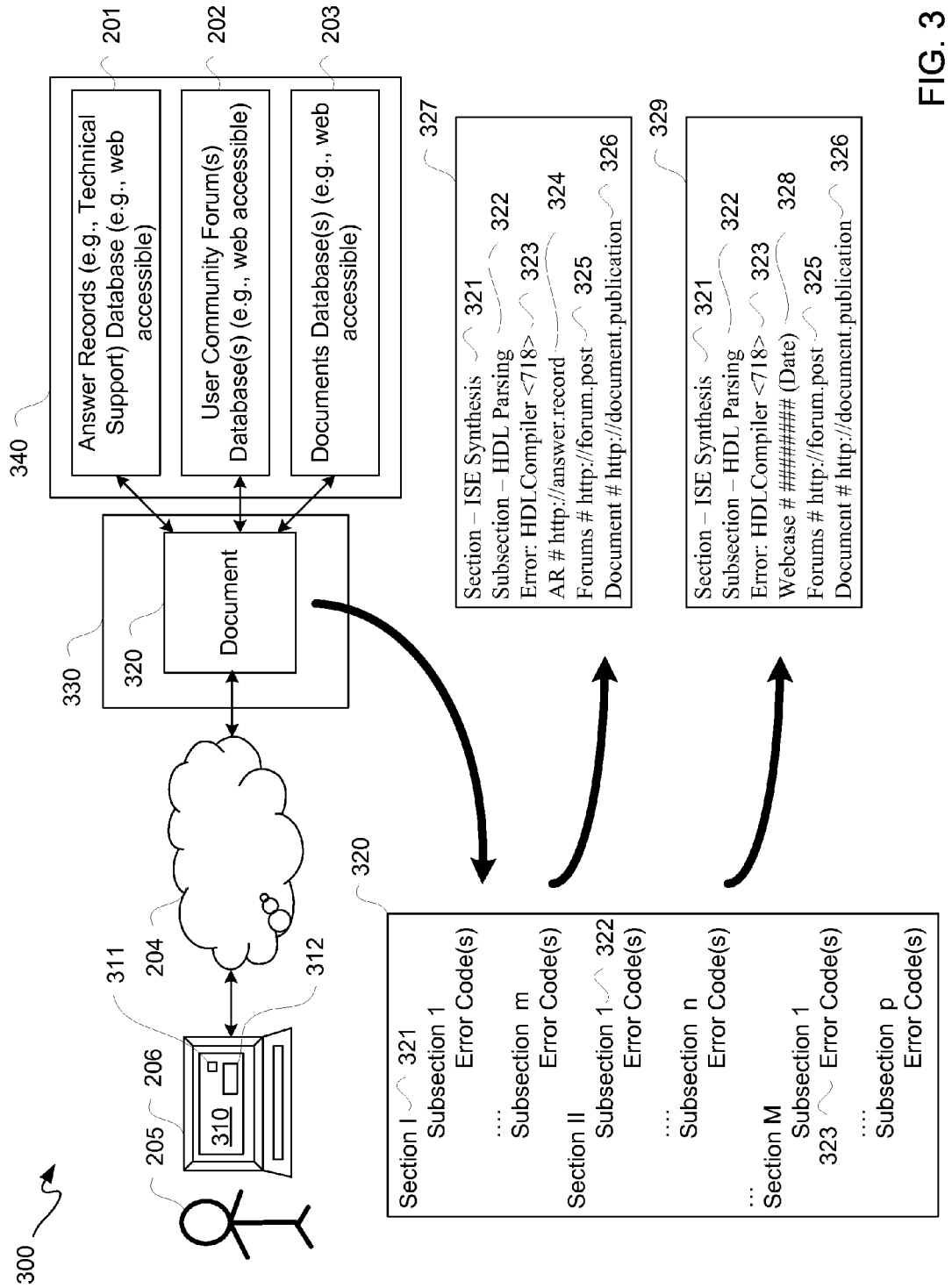
FIG. 3 is a block/perspective diagram depicting an exemplary on-the-fly technical support flow.

FIG. 3 is a block/perspective diagram depicting an exemplary on-the-fly technical support flow 300. Technical support flow 300 may be carried out with an information handling system. Such an information handling system may include a computer 206, a server 330, one or more servers 340, and a network cloud 204. In this example, network cloud 204 is an Internet cloud.

A user 205 using a computer 206 may encounter an error when executing a software tool ("tool") 310. Tool 310 may include an icon 311 for invoking a technical support application ("debugger"), as described below in additional detail. Again, in this example, database 201 may be a web accessible database of answer records, such as from technical support answering user questions, also known as "webcases." Database 202 may be one or more web accessible user community forums having posts threads thereof answering user questions. Lastly, database 203 may be web accessible documents, which may be provided by a manufacturer of a product.

Icon 311 or other graphical user interface ("GUI") may be used to invoke a debugger (hereinafter "debugger 311") to automatically search one or more databases. Databases may be local on computer 206 or may be online. For purposes of clarity and not limitation, it shall be assumed that online databases 201 through 203 are used. If a helpful solution is not found, debugger 311 may automatically create a webcase for technical support and a forum post for a user community.

Technical support flow 300 may be for any of a variety of tools 310 which may encounter one or more errors. For purposes of clarity by way of example and not limitation, an electronic design automation ("EDA") tool is described, even though in other instances other types of may be used. Along those lines, technical support module 311 may be a debugger, and technical support flow 300 may be a debug flow.

Once an EDA tool 310 encounters an error, a user 205 may select an icon thereof to invoke debugger 311 of EDA tool 310 to thereafter automatically search databases, as described below in additional detail. In another embodiment, EDA tool 310 may automatically search databases, as described below in additional detail, responsive to generation of an error. However, for an expert user, an icon may be more useful, as an expert user 205 may not wish to automatically search databases responsive to each error generated.

Debugger 311 may communicate with a server 330 over Internet cloud 204 to access document 320. Server 330 may be a secure server. Server 330 may host document 320. Document 320 may be subdivided into a plurality of sections 321, and one or more of such sections 321 may be further subdivided into a plurality of subsections 322. Sections 321 may be for a plurality of executable modules of an EDA tool 310. One or more error codes 323 associated with a section-subsection may be located in such an associated subsection.

For an EDA example, sections or EDA processes may include implementation and synthesis, among others. Subsections may be stages within such EDA processes. Stages or subsections of an implementation process or section for example may include a translate stage, a map stage, and a place and route stage. Hardware Description Languages ("HDLs") may include without limitation Verilog, VHDL, and SystemC. Stages or subsections of a synthesis process or section may include an HDL parsing and elaboration stage, an HDL synthesis stage, an advanced synthesis stage, and a low-level synthesis stage. Each stage may contain all known error codes such EDA tool 310 can generate for such stage, generally due to contention when executing a stage.

Each error code 323 may have information associated therewith embedded under it. Such information embedded under an error code 323 may include one or more online answer record links 324 to database 201, one or more user community forum links 325 to database 202, and/or one or more documentation links 326 to database 203 to provide an error record 327. Subsections 322 may be associated with one or more error records 327, as described below in additional detail. One or more error records 327 may be associated with one or more error codes in association with one or more errors that can occur under associated subsections or stages 322.

For example, an error record 327 of document 320 is shown as an example for an ISE Synthesis section 321, an HDL Parsing Subsection 322, an HDL Compiler error code 323, an answer record ("AR") link 324, a user community forum link 325, and a web accessible document link 326. Thus, for example, a link to a matching online answer record may be provided, where such answer record has sufficient information/workaround for debugging an encountered error. Answer records may be created by Product Application Engineers of the manufacturer/producer of such EDA tool 310, where such answer records may highlight resolved errors and steps taken to achieve same. A link to a matching online user community forum link may be provided, where such forum post and threads thereof may contain various guidance/debugging steps provided by forum members. Such a forum may employ social networking technology. A link to a matching online documentation reference may be provided, which may help a user debug such an encountered error by referring to one or more portions of such online reference.

At least one server 340 may be used for hosting of databases 201 through 203. Error records 327 may have at least one link to at least one of databases 201 through 203 for fetching relevant information therefrom for resolving one or more errors.

Server 330 may be programmed to search document 320 responsive to receipt of a case inquiry. A case inquiry may be sent from debugger 311 to server 330 in response to an error. More particularly, an error message generated by EDA tool 310 in response to an encountered error may be a basis for debugger 311 sending such a case inquiry. Server 330 may be programmed to create a copy of a subsection 322 of such subsections 322 of document 320 responsive to such case inquiry. Along those lines, all error codes 323 in an identified section-subsection may be sent to computer 206 to provide a local copy 312 on computer 206. Such local copy 312 may be stored on computer 206 and may be displayed in a window 312 of EDA tool 310. Server 330 may be programmed to send such copy of a subsection 322 of document 320 to a client, such as computer 206, originating such case inquiry.

Figure 4:
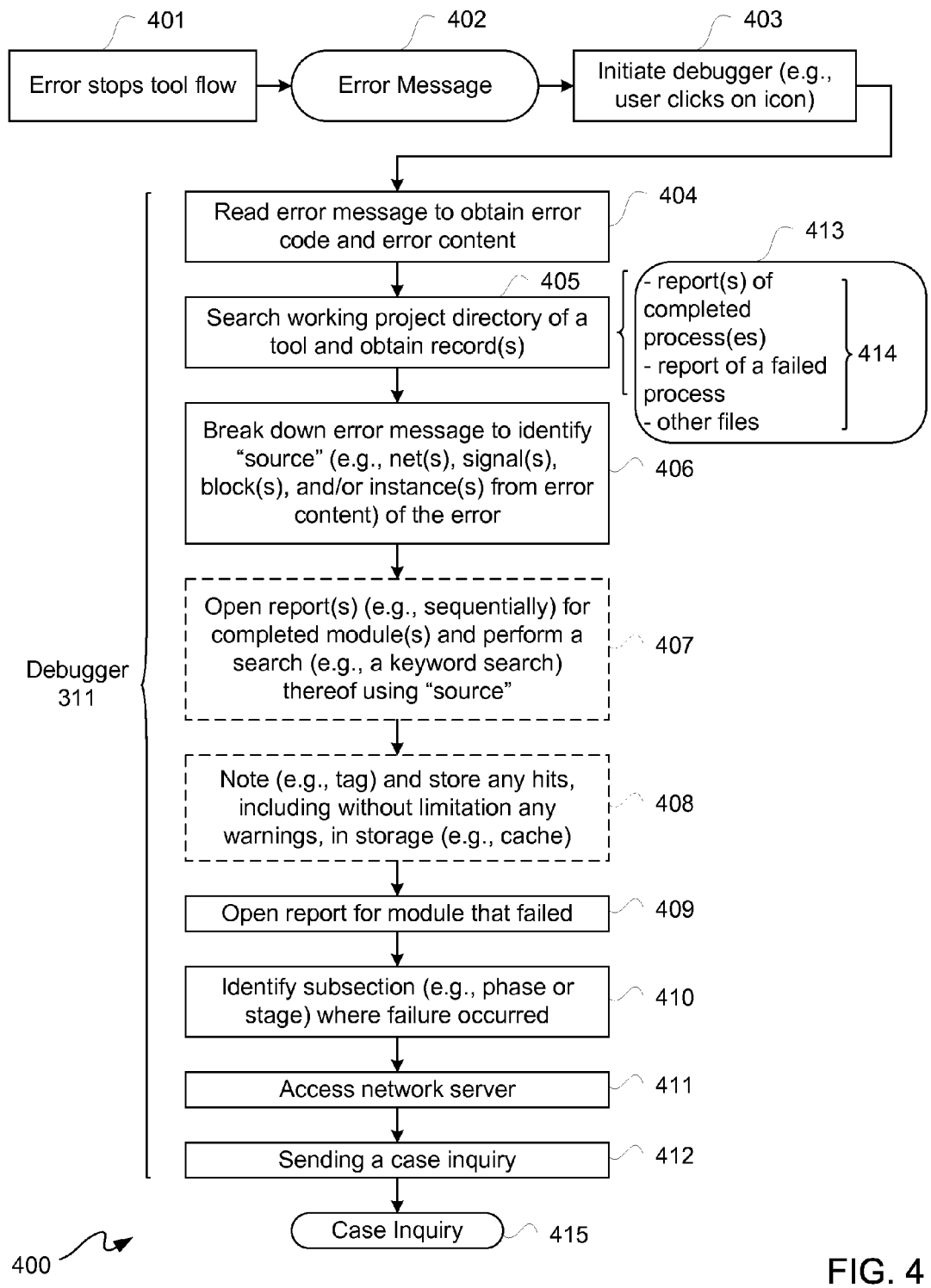
FIG. 4 is a flow diagram depicting an exemplary debug flow.

If no error record 327 is present in document 320 to respond to a case inquiry, or if a user does not find a solution to an error in such local copy, debugger 311 may initiate a webcase, and an entry may be created in document 320 for such unresolved issue, namely a trouble ticket or a webcase. Server 330 may be programmed to update document 320 to create an entry for a webcase. For purposes of clarity by way of example and not limitation, error record 329 is an example of a webcase. Error record 329 may include a section of sections 321, a subsection of subsections 322, and an error message having an error code of error codes 323. Error record 329 may further include a webcase number and date 328 indicating that technical support is involved. Error record 329 may further include a link 325 to a community forum post in database 202 in order to put others on notice that such error is currently being addressed in a community users forum. Error record 329 may yet further include a link 326 to documentation in databases 203 associated with where such error arose. Continuing the illustrated example, suppose an error occurred while running synthesis, which debugger 311 has already identified, a link to a synthesis user guide may be provided. Once a webcase is resolved an application engineer, such application engineer may document such resolution in an answer record and link a corresponding webcase number to a new answer record FIG. 4 is a flow diagram depicting an exemplary debug flow 400, which may be performed by an information handling system. Debug flow 400 may be used for on-the-fly technical support flow 300 of FIG. 3. Again, for purposes of clarity by way of example and not limitation, it shall be assumed that debug flow 400 is a debug flow for users of an EDA tool. With simultaneous reference to FIGS. 3 and 4, debug flow 400 is further described.

At 401, an encountered error may stop a process or module of a tool 310, namely stops such tool's flow. In response to such error, such tool 310 may generate an error message 402. In response to error message 402, at 403, a debugger 311 may be initiated. Again, for purposes of clarity and not limitation, a user 205 may click on a debug icon of a GUI of tool 310.

Operations 404 through 412 may be performed by a debugger 311 executing on computer 206. Debugger 311 may be a computer-readable program stored on a tangible computer-readable storage medium, as described elsewhere herein, where debugger 311 is capable of being processed by computer 206 or other information handling system for causing computer 206 to perform operations 404 through 412. Other operations described herein may be performed by other components of an information handling system as described with reference to FIG. 3.

At 404, debugger 311 reads an error message 402 generated by tool 310 to obtain an error code from such error message. Debugger 311 may further read such error message to obtain error content associated with such error message.

Tool 310 may have an information handling system project directory for a design currently being processed. EDA tools may have a dependency flow, and so a current process being executed by EDA tool 310 may depend on one or more inputs from one or more prior completed modules or processes for a current activity. This may help debugger 311 to narrow down to a failing module and identify a last completed module, as well as any other completed modules, if any. For example, if an error occurs in a mapping process, debugger 311 may be able to identify past completed modules for a current activity, which are synthesis and translation.

At 405, an information handling system project directory 413 may be searched to obtain a report. As an EDA tool 310 progresses through a current EDA activity, such EDA tool 310 may generate a report of one or more reports 414 for each module, whether completed or not. Thus, one or more reports 414 of one or more corresponding completed modules may be present, as well as a report of reports 414 for a failed module. Files other than reports may be present in project directory 413. For example, debugger 311 may pull out a summary xml file for a top module for a current EDA activity.

At 405, a report of reports 414 may indicate a failed module of a plurality of executable modules of EDA tool 310. Accordingly such report obtained may be associated with an error message read at 404. Even a report for a completed module may indicate one or more warnings of one or more potential errors. These one or more warnings obtained from one or more summary reports, whether for completed or failed modules, may be helpful in debugging an error.

At 406, debugger 311 may break down error message 402 to identify one or more of circuit elements, if any, associated with an error. Such circuit elements for example may be one or more nets, signals, blocks, ports, and/or instances and may be part of error content in an error message. Such circuit elements are generally referred to as a "source" of an error. In other words, a "source" may identify what is in an error message with respect to circuitry in this example.

At 407, with information fetched at 405, debugger 311 may optionally open reports 414 sequentially for all completed modules and perform a keyword search in each of such reports using "source" information. Information obtained from such keyword searching may be used to identify warnings which a user has ignored but which may be a cause behind an error associated with error message 402.

Optionally, at 408, hits, including without limitation any warnings, from such keyword searching at 407 may be noted, such as tagged for example, and stored in storage, such as cache for example. For example, if an error in a map module identifies a signal named pcie_0, debugger 311 may first open a synthesis module report (e.g., with an extension "syr") and look for warnings related to pcie_0, and If debugger 311 finds any matching warning, then debugger 311 may save each of such warnings in debugger 311 cache. If, however, debugger 311 does not find any matches from a search at 407 in a synthesis module, then debugger 311 may open a translate module report (e.g., extension "bld") and continue processing modules sequentially according to dependency.

At 409, a report of a failed module is opened. At 410, a failed subsection, phase, or stage of such failed module is identified from a report obtained at 405. For example, debugger 311 may open a report file for a module where EDA tool 310 failed and scans down to a subsection, phase or stage ("stage") in which such failure occurred.

With a stage where a failure occurred, a case inquiry 415 of an online document 320 may be made, where such case inquiry 415 includes a section-subsection to be searched, namely a failed stage of a module for example. Optionally, case inquiry 415 may include an error code from error message 402 for a configuration where server 330 performs a search of online document 320, as described below in additional detail.

Debugger 311 may access a network server 330 at 411, where such network server 330 hosts such online document 320, and a case inquiry may be sent at 412 for error message 402 to such network server 330 to search in a corresponding stage or subsection 322 of such online document 320. Such online document 320 may be structured, as previously described, with one or more known error codes 323 for each subsection 322 of each section 321 being listed, along with associated links.

Figure 5:
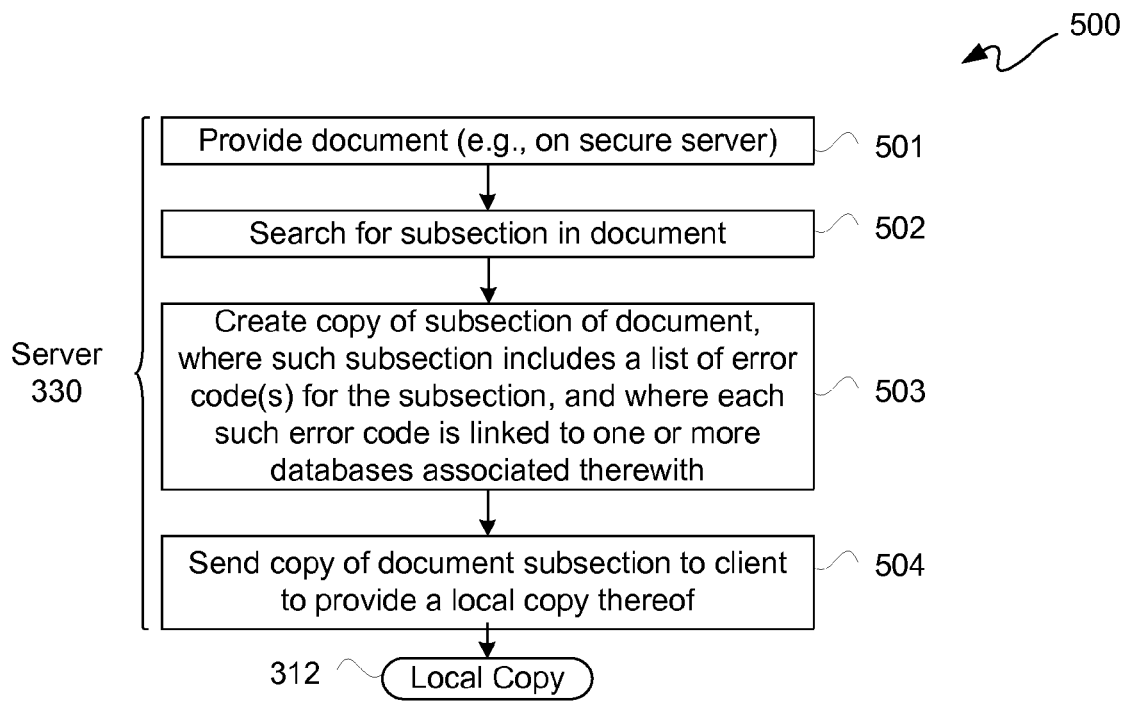
FIG. 5 is a flow diagram depicting an exemplary web-accessible server flow.

FIG. 5 is a flow diagram depicting an exemplary web-accessible server flow ("server flow") 500 for server 330. In other words, server 330 may be a programmed computer to execute instructions to carry out operations of server flow 500. With simultaneous reference to FIGS. 3 through 5, server flow 500 is further described.

At 501, a document 320 hosted by server 330 is provided. Again, server 330 may be a secure server. At 502, using a module and stage, or section and subsection, in a case inquiry sent at 412, a search of such subsection of document 320 is performed. This search is relative fast, as only a subsection is searched for an error code for example, and subsequent searching is done at the client level using a local copy.

At 503, a copy of such subsection is created. This copy of a subsection 322 includes a list of one or more error codes 323 associated with such subsection. Each error code 323 may include content, which may include one or more links to one or more databases having information associated with such error code. At 504, such copy may be sent to a client, such as computer 206 for example, in response to a case inquiry sent at 412. In other words, in response to a case inquiry sent at 412, server 330 may fetch and send a subsection of document 320 client computer for use as a local copy 312 of such client computer 206.

Furthermore, a user 205 performing debugging may be an iterative activity, involving multiple accesses of a local copy. By having a local copy 312, a user 205 may not have to go back to server 330 over and over for a same error. Also, by searching of a local copy, searching for error codes may be off-loaded from server 330 to client computer 206. Additionally, by providing a client computer 206 with a local copy 312, as previously described, debugger 311 may quickly display webcase information in the event such error is seen again by user 205. With respect to an open webcase, a user 205 would be informed that such an error has been identified, as described below in additional detail.

Figure 6:
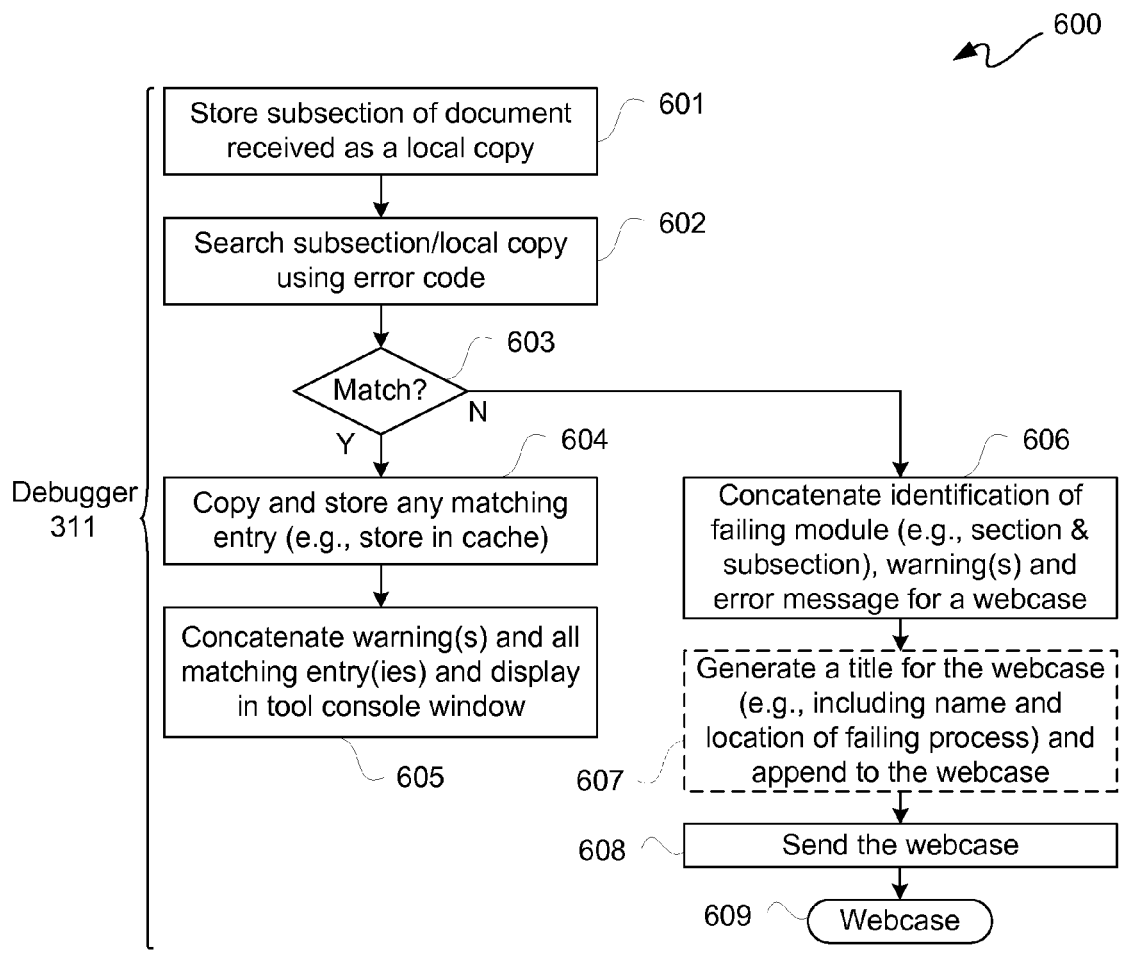
FIG. 6 is a flow diagram depicting an exemplary debug flow, which may be an extension of the debug flow of FIG. 4.

With simultaneous reference to FIGS. 3 through 6, where FIG. 6 is a flow diagram depicting an exemplary debug flow 600, which may be performed by an information handling system in response to receiving a local copy 312 of a subsection 322 of document 320 in response to a case inquiry sent at 412. Debug flow 600 may be an extension of debug flow 400. Along those lines, operations of debug flow 600 may be executed by debugger 311, as described below in additional detail.

At 601, a subsection 322 or other portion of an online document 320 is received by client computer 206 in response to a case inquiry sent at 412 and stored as a local copy 312. Such subsection 322 is associated with a failed stage of an EDA tool 310, and such subsection 322 is provided responsive to execution of debugger 311.

At 602, such local copy 312 may be searched using an error code obtained from error message 402. At 603, it is determined whether such error code obtained from error message 402 is present in such local copy 312. If at 603 a match to such error code is found in such local copy 312, at 604 such matching entry may be copied and stored. Such matching entry may be stored in cache memory of computer 206. In an embodiment, more than one matching entry may be found in a subsection. In such an embodiment, each such matching entry may be copied and stored in cache memory.

For purposes of clarity by way of example, if EDA tool 310 fails in synthesis with error HDL Complier Error 718 such as illustratively depicted in FIG. 3, debugger 311 may open a.syr file therefor and may look for a phase where EDA tool 310 failed. If EDA tool 310 fails in HDL parsing, server 330 may search a same section-subsection in online document 320, and return complete content under such section-subsection as a local copy 312. Debugger 311 may search for error code 718 in such local copy 312 and return content under such error code, e.g. a matching answer record link 324, forums entry link 325, and documentation link 326. In an embodiment, debugger 311 may automatically execute one or more of links 324 through 326 to display information in associated databases 201 through 203 in a console window EDA tool 310 or other window.

At 605, all warnings obtained at 408 from completed reports in directory 413 may be concatenated or otherwise combined or grouped with all matching entries stored at 604, and such result may be displayed in a console window of EDA tool 310. Using this information, a user 205 may be able to debug an error causing invocation of error message 402. Debugging may be an iterative activity involving some trial and error. So by providing a user 205 with all identified relevant information for resolving such error, a user 205 may be more likely to fix a cause of such error on their own without having to resort to contacting a technical support representative.

If, however, at 603 no matching entry to an error code of error message 402 is found in local copy 312 from searching at 602, a webcase may be automatically initiated by debugger 311 using operations 606 through 608.

At 606, responsive to not finding any matching entry of an error code in local copy 312, identification of a failing module of EDA tool 310 may be concatenated or otherwise combined or grouped with any and all warnings stored at 408 and error message 402 to provide a webcase. Furthermore, for an EDA example, associated design files may be concatenated to provide such a webcase. Identification of a failing module of EDA tool 310 may be provided by providing a section 321 and subsection 322, namely a module and stage for example, where such failure occurred.

Accordingly, any and all relevant information associated with error message 402 may be obtained for providing to technical support. For example, design files and reports associated with such webcase may be automatically attached to such a webcase for application engineers of a technical support help desk. This may speed up resolution of errors, as well as provide more consistency in resolving errors.

Optionally, at 607, a title may be automatically generated for and appended to such webcase provided at 606. Such title may include a name and a location of an identified failing module by module name and stage thereof. At 608, such a webcase 609 may be sent over a network, such as Internet cloud 204, to server 330.

Figure 7:
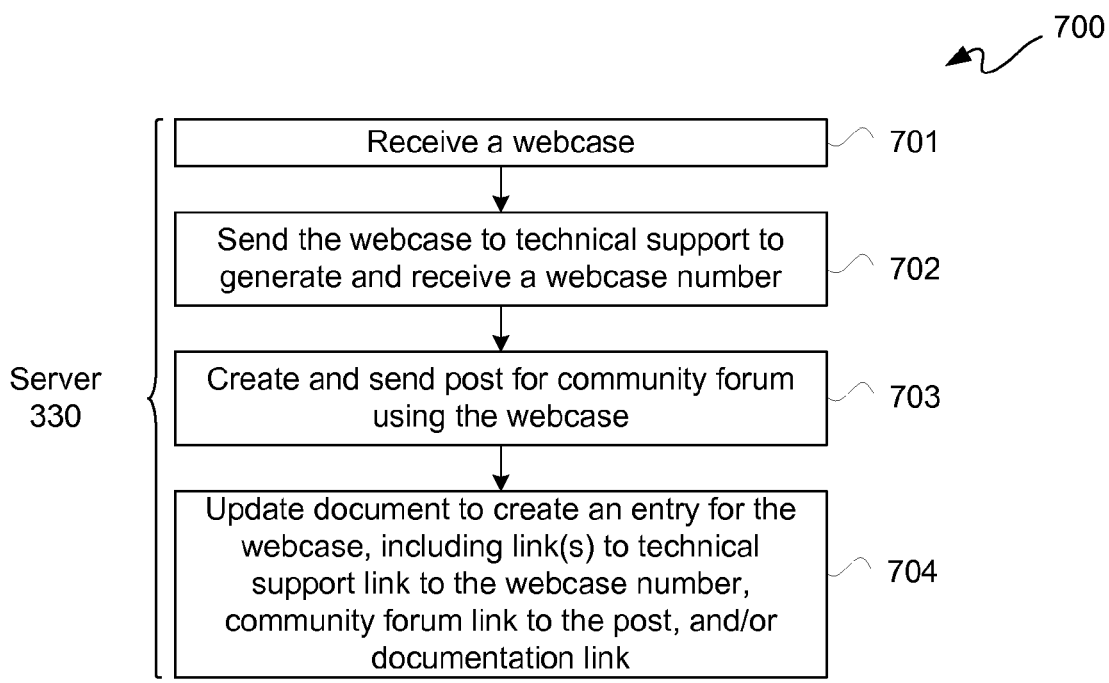
FIG. 7 is a flow diagram depicting an exemplary webcase entry generation flow.

FIG. 7 is a flow diagram depicting an exemplary webcase entry generation flow 700. As described below in additional detail, webcase entry generation flow 700 may include generating both a webcase entry and a community user forum post.

At 701, server 330 may receive webcase 609. At 702, received webcase 609 may be sent by server 330 to technical support to generate and receive therefrom a webcase number. At 703, server 330 may create and send a post for a user community forum using webcase 609. An abbreviated version of webcase 609 may be sent to user community forum database 202 to create a post therein. Thus, webcase 609 may be sent to both a user community forum address and a technical support address over Internet cloud 204.

At 704, server 330 may update online document 320 to create an entry for webcase 609. Such entry may include a link to technical support database 201 using a webcase number for webcase 609, a link to a post associated with webcase 609 in user community forum database 202, and/or a link to documentation associated with webcase 609.

By creating such an entry in online document 320, one or more subsequent users encountering the same error may be made aware that such error is a known error which is currently being worked on. This may be used to prevent duplication of error searching and/or webcase creation by other users. Furthermore, repetitions of such error may more easily and accurately be addressed in future by having consistency due to automation of providing debugging information, as previously described.

Figure 8:
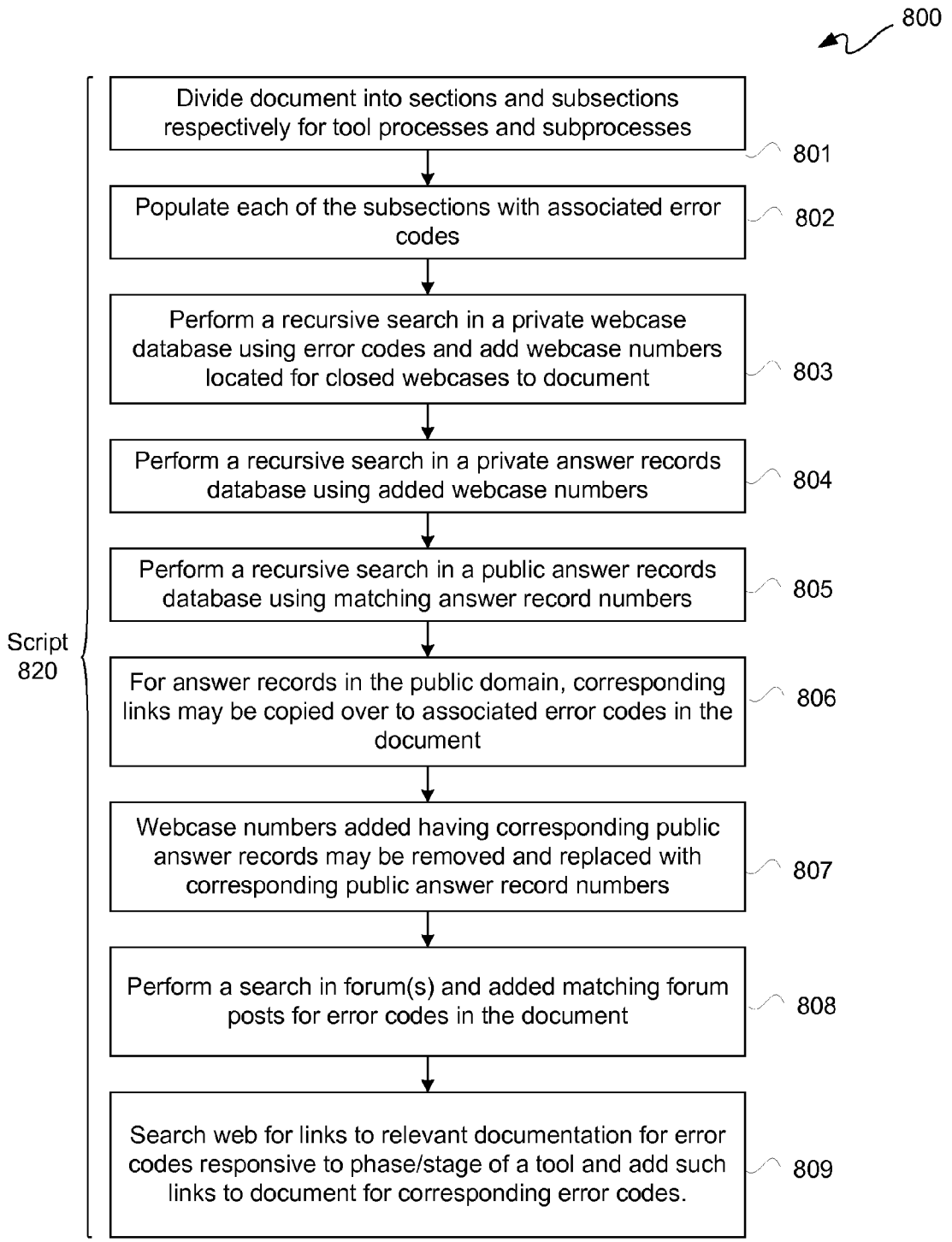
FIG. 8 is a flow diagram depicting an exemplary document creation flow.

FIG. 8 is a flow diagram depicting an exemplary document creation flow 800. Document creation flow 800 may be a script 820 for creation of document 320 of FIG. 3, where such script or computer-readable program 820 may be stored in a tangible computer-readable storage medium, and where such script 820 is capable of being processed by an information handling system for causing such information handling system to perform operations of script 820. Document creation flow 800 is further described with simultaneous writ reference to FIGS. 3 through 8.

At 801, a document 320 to be created may be organized with sections 321 and subsections 322 thereof corresponding to EDA tool 310 modules and stages thereof. At 802, each of such subsections 322 may be populated with associated error codes 323. At 803, a recursive search in a private webcase database (not shown) may be performed using such error codes 323 to identify webcases in a closed state having error codes 323 for such EDA tool 310. For closed webcases found, webcase numbers may be obtained and added to document 320 under corresponding error code sections.

At 804, a recursive search of a private answer records database (not shown), which may be a separate database from public answer records database 201, may be performed using webcase numbers obtained at 803 for answer records linked to such webcases. Matching answer records may be best matches for such particular errors.

At 805, answer record numbers of matching answer records from a search at 804 may be copied and searched in a public answer records database 201. This is a check to determine if an answer record has been released for public consumption. For matching answer record numbers in public answer records database 201 for such search at 805, at 806 such matching public answer record numbers may have their corresponding links copied over into document 320 under corresponding error codes. At 807, webcase numbers added to document 320 at 803 having corresponding public answer records may be removed and replaced with corresponding public answer record numbers.

At 808, script 820 may perform a search in one or more user community forum databases 202 and add each matching forums entry for each corresponding error code in document320 under such error code. Each such matching forum entry may be added below an answer record entry found at 807, if present, under such error code.

At 809, a web search for links to relevant documentation for error codes responsive to phase/stage of a tool may be performed and any found links may be add to document 320 under corresponding error codes.

Whenever debugger 311 encounters a new error in EDA tool 310, debugger 311 may submit a new technical support webcase and create a forum entry, as previously described. This information is updated in document 320 along with documentation links.

A portion of script 820, which portion may be provided as a separate script, may be scheduled run routinely to look for new errors which have associated new webcases created with a closed resolution status, namely to perform a search at 803 for such new webcases having a closed status, to perform a search at 804 using such webcase numbers obtained for such new webcases in order to fetch corresponding answer record details including answer record numbers, as well as to verify status of such corresponding answer records as being released to the public, a search at 805 for such released answer records in public answer records database 201, and updating webcase entries in document 320 with links to such answer records. Such portion of script 820 may be performed on all errors in document 320 which do not have an associated answer record.

Figure 9:
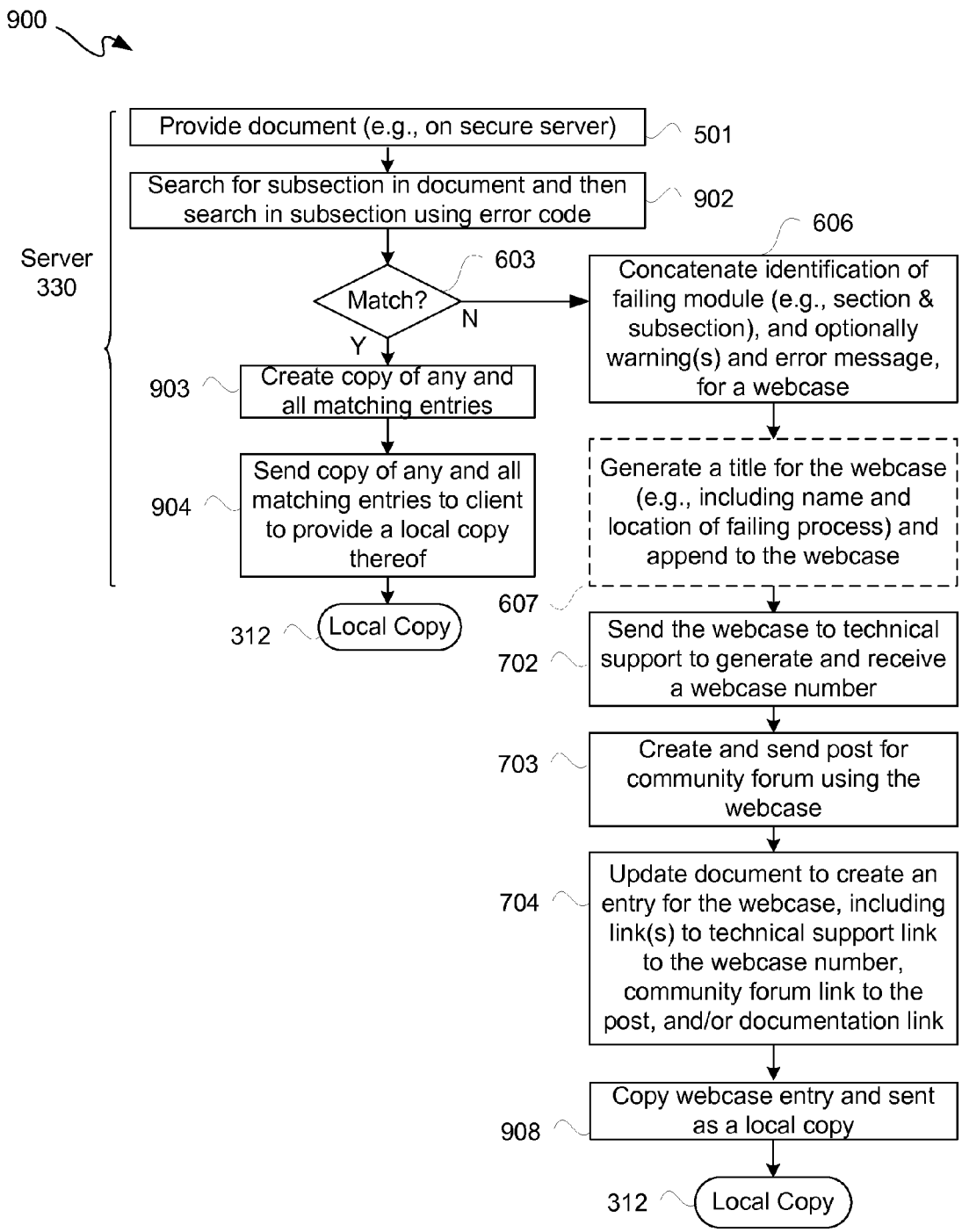
FIG. 9 is a flow diagram depicting another exemplary web-accessible server flow.

FIG. 9 is a flow diagram depicting another exemplary web-accessible server flow ("server flow") 900 for server 330. With simultaneous reference to FIGS. 3 through 7, server flow 900 is further described.

At 501, a document 320 may be provided online as hosted by server 330 as previously described. At 902, server 330 may search document 320 at an identified section-subsection with an error code provided in a case inquiry 415 sent at 412, where such case inquiry 415 includes an identified section-subsection to search and an error code. At 603, it may be determined by server 330 whether there is any matching entry, as previously described though for client computer 206 executing debugger 311. At 903, server 330 may create a copy of any and all matching entries for sending to client computer 206 at 904 as a local copy 312. Accordingly, in this configuration, server 330 performs an error code search to provide a local copy, not of an entire subsection, but only of one or more matching error code entries in an identified subsection in contrast to the previously described configuration.

For this example, case inquiry 415 may further include any and all warnings stored at 408 and error message 402. So, if at 603 there is no matching entry, server 330 may perform operations 606, and optionally 607, as previously described, though by client computer 206. Server 330 may further perform operations 702 through 704, as previously described. At 908, a webcase entry in document 320 prepared by server 330 may be copied and sent to a client computer 206 to provide as a local copy 312. Thus, user 205 may be informed that document 320 did not have any relevant information responsive to error message 402, and that a webcase was initiated to obtain relevant information for debugging to resolve an error code in error message 402.

Figure 10:
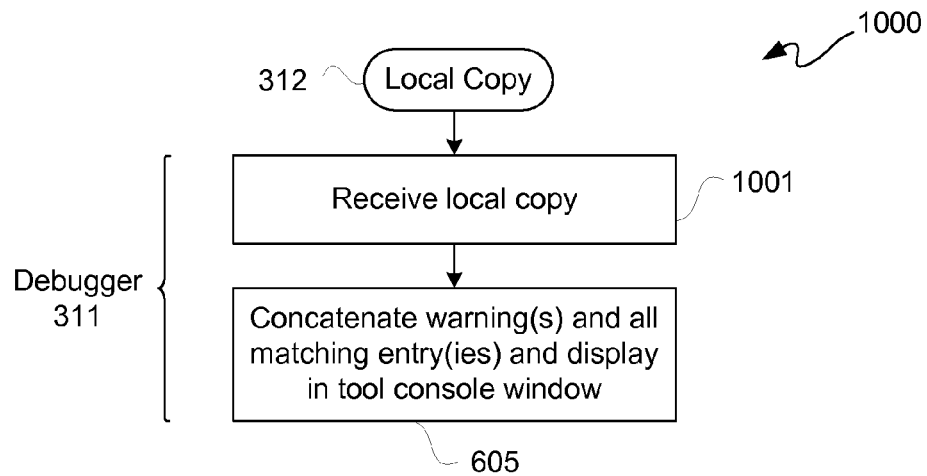
FIG. 10 is a flow diagram depicting an exemplary webcase flow for the server flow of FIG. 9.

FIG. 10 is a flow diagram depicting an exemplary webcase flow 1000 for debugger 311 for server flow 900 of FIG. 9. At 1001, a local copy 312 from server flow 900 may be received by a client computer 206. Such local copy 312 may be a copy of a webcase entry 329 in online document 320. After receipt of such local copy 312 at 1001, operation 605 may be performed as previously described using such local copy of a webcase entry.

Figure 11:
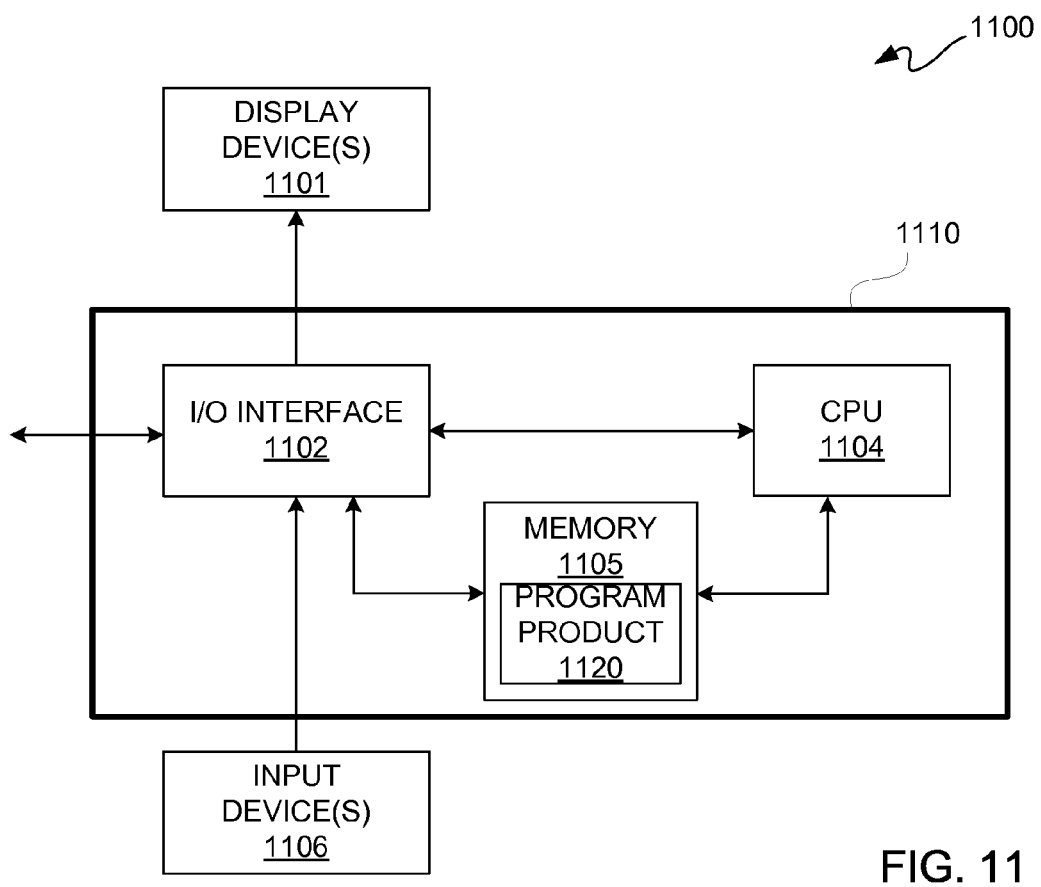
FIG. 11 is a block diagram depicting an exemplary of a computer system.

FIG. 11 is a block diagram depicting an exemplary computer system 1100. Computer system 1100 may include a programmed computer 1110 coupled to one or more display devices 1101, such as Cathode Ray Tube ("CRT") displays, plasma displays, Liquid Crystal Displays ("LCD"), projectors and to one or more input devices 1106, such as a keyboard and a cursor pointing device. Other known configurations of a computer system may be used. Computer system 1100 by itself or networked with one or more other computer systems 1100 may provide an information handling system.

Programmed computer 1110 may be programmed with a known operating system, which may be Mac OS, Java Virtual Machine, Real-Time OS Linux, Solaris, iOS, Android Linux-based OS, Unix, or a Windows operating system, among other known platforms. Programmed computer 1110 includes a central processing unit (CPU) 1104, memory 1105, and an input/output ("I/O") interface 1102. CPU 1104 may be a type of microprocessor known in the art, such as available from IBM, Intel, ARM, and Advanced Micro Devices for example. Support circuits (not shown) may include cache, power supplies, clock circuits, data registers, and the like. Memory 1105 may be directly coupled to CPU 1104 or coupled through I/O interface 1102. At least a portion of an operating system may be disposed in memory 1105. Memory 1105 may include one or more of the following: flash memory, random access memory, read only memory, magneto-resistive read/write memory, optical read/write memory, cache memory, magnetic read/write memory, and the like, as well as non-transitory signal-bearing media as described below.

I/O interface 1102 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 1102 may be coupled to a conventional keyboard, network, mouse, display printer, and interface circuitry adapted to receive and transmit data, such as data files and the like. Programmed computer 1110 may be coupled to a number of client computers, server computers, or any combination thereof via a conventional network infrastructure, such as a company's Intranet and/or the Internet, for example, allowing distributed use for interface generation.

Memory 1105 may store all or portions of one or more programs or data to implement processes to provide program product 1120. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of program product 1120, as well as documents thereof, may define functions described herein and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD). The above examples specifically include information downloaded from the Internet and other networks. Such non-transitory signal-bearing media, when carrying computer-readable instructions that direct functions hereof, can also be used to implement the functions described herein.

Though a debugger for an EDA tool was described, such on-the-fly technical support may be used for other applications and thus other industries. Such on-the-fly technical support may be useful in improving overall consumer experience in using an application, which may be impart due to consistent results and relevant information provided to a user. Furthermore, manual searching by a user may be eliminated in favor of more time efficient and more accurate automatic searching. Additionally, duplicate entries may be reduced or eliminated, which may reduce time wasted on handling errors which have already been resolved. Along those lines, both application engineers and/or a community of users may be solicited for error resolution.

While the foregoing describes exemplary embodiments, other and further embodiments in accordance with the one or more aspects may be devised without departing from the scope thereof, which is determined by the claims that follow and equivalents thereof. Claims listing steps do not imply any order of the steps. Trademarks are the property of their respective owners.

What is claimed is:

1. A method of providing technical support for a tool having a plurality of executable modules, each module including a plurality of stages, the method comprising:
   reading an error message by a technical support application to obtain an error code therefrom;
   searching a project directory by the technical support application to obtain a first report indicating a failed module of the plurality of executable modules;
   wherein the plurality of executable modules are for a design automation program;
   wherein the first report is associated with the error message;
   identifying a failed stage of the stages of the failed module from the first report; and
   preparing a case inquiry for the error message, the case inquiry identifying the failed stage and the error code;
   searching a document for an entry that matches the failed stage and the error code, wherein each entry in the document specifies a stage, an error code and links to databases associated with the error code;
   if an entry matches the failed stage and error code, displaying the matching entry in a window;
   if an entry does not match the failed stage and error code, creating an entry in the document including the error code and a link to information indicating that the error is currently being addressed;
   wherein the reading, searching, identifying a failed stage, preparing a case inquiry, searching, displaying and creating are performed by an information handling system.

2. The method according to claim 1, further comprising:
   opening a second report indicating a completed module;
   searching the second report using the source; and
   storing each match from the searching of the second report.

3. The method according to claim 1, further comprising:
   storing a portion of the document retrieved responsive to the case inquiry, the portion being associated with the failed stage; and
   searching the portion using the error code.

4. The method according to claim 3, further comprising:
   storing a matching entry of the error code found in the portion from the searching thereof, and
   displaying the matching entry in a window.

5. The method according to claim 3, further comprising:
   identifying an element processed by the tool as being a source of an error from the error message;
   opening a second report indicating a completed module;
   searching the second report using the source;
   storing a warning having the source found in the second report from the searching thereof;
   storing a matching entry of the error code found in the portion from the searching thereof,
   combining the warning and the matching entry for display in a window; and
   displaying the warning and the matching entry in the window.

6. The method according to claim 1, further comprising:
   opening a second report indicating a completed module;
   searching the second report using the source;
   storing a warning having the source found in the second report from the searching thereof; and
   if an entry does not match the failed stage and error code, adding the warning to the created entry.

7. The method according to claim 1, further comprising:
   generating a title for the created entry, the title including a name and a location of the failed module as associated with the failed stage; and
   appending the title to the created entry.

8. The method according to claim 1, further comprising providing the created entry to both a user forum address and a technical support address over a network.

9. The method according to claim 1, wherein the plurality of executable modules are for an electronic design automation program that is the design automation program.

10. A system for providing technical support for a tool having a plurality of executable modules, each module including a plurality of stages, the system comprising:
    a first server for hosting a document online, the document including a plurality of sections and a plurality of subsections for the plurality of sections;
    wherein the plurality of subsections is associated with one or more error records;
    wherein the one or more error records are associated with one or more error codes in association with one or more errors that can occur under the plurality of subsections; and
    at least a second server for hosting a plurality of databases, the second server being communicatively coupled to the first server;
    wherein the one or more error records have at least one link to at least one of the plurality of databases for fetching relevant information therefrom for resolving the one or more errors, the one or more errors being associated with one or more executable modules of a project directory for a design automation program on a client system;
    wherein:
       the first server is programmed to search the document responsive to receipt of a case inquiry from a client, the case inquiry identifying a failed stage of one of the plurality of modules and an error code;
       the first server is programmed to create a copy of a subsection of the subsections responsive to the case inquiry matching the subsection; and
       the first server is programmed to send the copy of the subsection to the client.

11. The system according to claim 10, wherein the first server is programmed to update the document to create an entry including the error code and a link to information indicating that the error is currently being addressed.

12. The system according to claim 11, wherein the created entry includes a section of the plurality of sections, a subsection of the plurality of subsections, and an error message having an error code of the one or more error codes.

13. The system according to claim 12, wherein the created entry further includes:
 a first link to a technical support request in the one or more of the plurality of databases; and
 a second link to a community forum post in the one or more of the plurality of databases.

14. The system according to claim 13, wherein the created entry yet further includes:
 a third link to documentation in the one or more of the plurality of databases.

15. A computer program product, comprising:
 a non-transitory computer-readable storage medium; and
 a computer-readable program stored on the tangible computer-readable storage medium;
 wherein the computer-readable program is processed by an information handling system for causing the information handling system to perform operations including:
  reading by a technical support application executed on the information handling system an error message generated by an application program to obtain an error code therefrom;
  wherein the application program includes a plurality of executable modules, and each module includes a plurality of stages for a design automation program;
  searching a project directory by a technical support application executed on the information handling system to obtain a first report generated by the application program, the first report indicating a failed module of the plurality of executable modules associated with the error message;
  identifying a failed stage of the stages of the failed module from the first report;
  preparing a case inquiry for the error message for searching an online document for resolution of the error, the case inquiry identifying the failed stage and the error code;
  searching a document for an entry that matches the failed stage and the error code, wherein each entry in the document specifies a stage, an error code and links to databases associated with the error code;
  if an entry matches the failed stage and error code, displaying the matching entry in a window;
  if an entry does not match the failed stage and error code, creating an entry in the document including the error code and a link to information indicating that the error is currently being addressed;
  accessing a network; and
  sending the case inquiry over the network.

16. The computer program product according to claim 15, wherein the operations further comprise:
 opening a second report, the second report indicating a completed module;
 searching the second report using the source; and
 storing each match from the searching of the second report.

17. The computer program product according to claim 15, wherein the operations further comprise:
 storing a portion of the online document retrieved responsive to the case inquiry, the portion being associated with the failed stage; and
 searching the portion using the error code.

* * * * *